UNITED STATES PATENT OFFICE.

ALFRED LILLEY, OF FREMONT, OHIO, ASSIGNOR OF TWO-THIRDS TO JULIUS J. MEHLE AND CHARLES PARDOE, BOTH OF SAME PLACE.

COMPOSITION FOR BLACKBOARDS.

SPECIFICATION forming part of Letters Patent No. 351,329, dated October 19, 1886.

Application filed March 2, 1886. Serial No. 193,810. (No specimens.)

*To all whom it may concern:*

Be it known that I, ALFRED LILLEY, a citizen of the United States of America, residing at Fremont, in the county of Sandusky and State of Ohio, have invented certain new and useful Improvements in Composition for Blackboards, of which the following is a specification.

My invention consists in an improved compound for constructing school-blackboards, substantially as hereinafter more fully described.

In the preparation of my compound I take sixty parts of Portland cement, one part of lamp-black or ivory-black, or its equivalent, and sixteen parts of "parting-sand," the latter being known to molders as the "burned sand," which they employ to separate castings from their matrices, or to separate the "flasks." It is ordinarily procured by separating from castings the burned sand adhering to them, and one part of powdered emery. The lamp-black or ivory-black is first "cut" with alcohol, and then the ingredients are thoroughly intermixed and blended into a homogeneous compound. The parting-sand having its color burned into it does not fade nor become in the least less black than when first made, and it gives a fine gritty surface, which is peculiarly adapted for causing the chalk to mark distinctly, the Portland cement rendering it hard and durable.

The compound thus made is spread and formed into blackboards by any ordinary means.

I am aware that it is not new to construct a blackboard of, first, hydraulic cement, sand, calcined sulphate of lime, and lime; and, secondly, of hydraulic cement, calcined sulphate of lime, black sand, and lamp-black; but I do not make any claim to such composition of ingredients.

Having thus fully described my invention, what I claim, and desire to secure by Letters Patent, is—

The herein-described blackboard composition, consisting of Portland cement, lamp-black or ivory-black, parting-sand, and powdered emery, in about the proportions specified, and for the purpose stated.

In testimony whereof I affix my signature in presence of two witnesses.

ALFRED LILLEY.

Witnesses:
LESTER WILSON,
J. W. PERO.